(12) United States Patent
Loftus et al.

(10) Patent No.: US 9,156,369 B2
(45) Date of Patent: Oct. 13, 2015

(54) BEV LIFE SUPPORT SYSTEM AND METHOD

(71) Applicant: FORD GLOBAL TECHNOLOGIES, LLC, Dearborn, MI (US)

(72) Inventors: Michael Edward Loftus, Northville, MI (US); Perry Robinson MacNeille, Lathrup Village, MI (US); John Proietty, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 14/013,901

(22) Filed: Aug. 29, 2013

(65) Prior Publication Data

US 2015/0066258 A1  Mar. 5, 2015

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60L 11/18 | (2006.01) |
| G01C 21/34 | (2006.01) |
| G01C 21/36 | (2006.01) |

(52) U.S. Cl.
CPC ......... *B60L 11/1861* (2013.01); *B60L 11/1838* (2013.01); *G01C 21/3469* (2013.01); *G01C 21/3691* (2013.01)

(58) Field of Classification Search
None
See application file for complete search history.

(56) References Cited

U.S. PATENT DOCUMENTS

| | | | |
|---|---|---|---|
| 8,301,323 B2 | 10/2012 | Niwa | |
| 2002/0188506 A1* | 12/2002 | Smith | 705/14 |
| 2011/0184600 A1* | 7/2011 | Kristinsson et al. | 701/22 |
| 2012/0065831 A1 | 3/2012 | Ross et al. | |
| 2012/0109519 A1* | 5/2012 | Uyeki | 701/439 |
| 2012/0187916 A1 | 7/2012 | Duer et al. | |
| 2012/0253568 A1 | 10/2012 | Uyeki | |
| 2013/0024112 A1 | 1/2013 | Tate, Jr. | |

OTHER PUBLICATIONS

Exploring an Architecture for Extending Vehicle Telematics Services to Mobile Devices: A Design Research Approach, Jun. 1, 2011.
Trip-Oriented Energy Management Control Strategy for Plug-In Hybrid Electric Vehicles, Dec. 15, 2011.

* cited by examiner

*Primary Examiner* — Mussa A Shaawat
*Assistant Examiner* — Abdhesh Jha
(74) *Attorney, Agent, or Firm* — David Kelley, Esq.; Tung & Associates

(57) ABSTRACT

A battery electric vehicle life support system for a battery electric vehicle. The system may include at least one controller adapted to receive charging station location data; a vehicle battery interfacing with the at least one controller, the at least one controller adapted to receive state of charge data from the vehicle battery; and the at least one controller adapted to determine a probability that the vehicle will reach at least one battery charging station based on the state of charge data and the charging station location data. A battery electric vehicle life support method is also disclosed.

20 Claims, 3 Drawing Sheets

BEV LIFE SUPPORT SYSTEM AND METHOD

FIELD

Illustrative embodiments of the disclosure generally relate to battery electric vehicles (BEVs). More particularly, illustrative embodiments of the disclosure relate to a BEV life support system and method in which an operator of a BEV is provided with data indicating the likelihood of the BEV reaching a charging station on the current state of charge of the vehicle battery.

BACKGROUND

Under some circumstances, the batteries of electric-powered vehicles may become depleted of electrical charge. The potential of becoming stranded along the roadside with a depleted traction battery is possible for operators of BEVs. This potential may be particularly problematic for BEV operators or occupants with special needs.

Range estimation algorithms for Battery Electric Vehicles (BEVs) are capable of predicting the State of Charge (SOC) of the vehicle's traction battery, predicting future energy consumption, and therefore, the likelihood of reaching a particular destination or range contour either along a planned route or around the vehicle's present position. Using charge station location data either from cloud sources (content delivery network) or internal on-board vehicle databases, the existence of charging sources that are within (or not within) the vehicle's range is easily identifiable.

Accordingly, a BEV life support system and method in which an operator of a BEV is provided with data indicating the likelihood of the BEV reaching a charging station on the current state of charge of the vehicle battery may be desirable. This capability may enable a vehicle operator to continue driving with little to no likelihood of reaching a charging station or, alternatively, to safely stop operation of the vehicle, request assistance and use the remaining traction battery charge for "life support functions" until help arrives.

SUMMARY

Illustrative embodiments of the disclosure are generally directed to a battery electric vehicle life support system for a battery electric vehicle. The system may include at least one controller adapted to receive charging station location data; a vehicle battery interfacing with the at least one controller, the at least one controller adapted to receive state of charge data from the vehicle battery; and the at least one controller adapted to determine a probability that the vehicle will reach at least one battery charging station based on the state of charge data and the charging station location data.

Illustrative embodiments of the disclosure are further generally directed to a battery electric vehicle life support method. The method may include obtaining state of charge data and charging station location data; determining probability of a battery electric vehicle reaching at least one charging station based on the state of charge data and the charging station location data; and communicating the probability of the battery electric vehicle reaching the at least one charging station to an operator of the vehicle. The operator of the vehicle may be able to disable this function.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
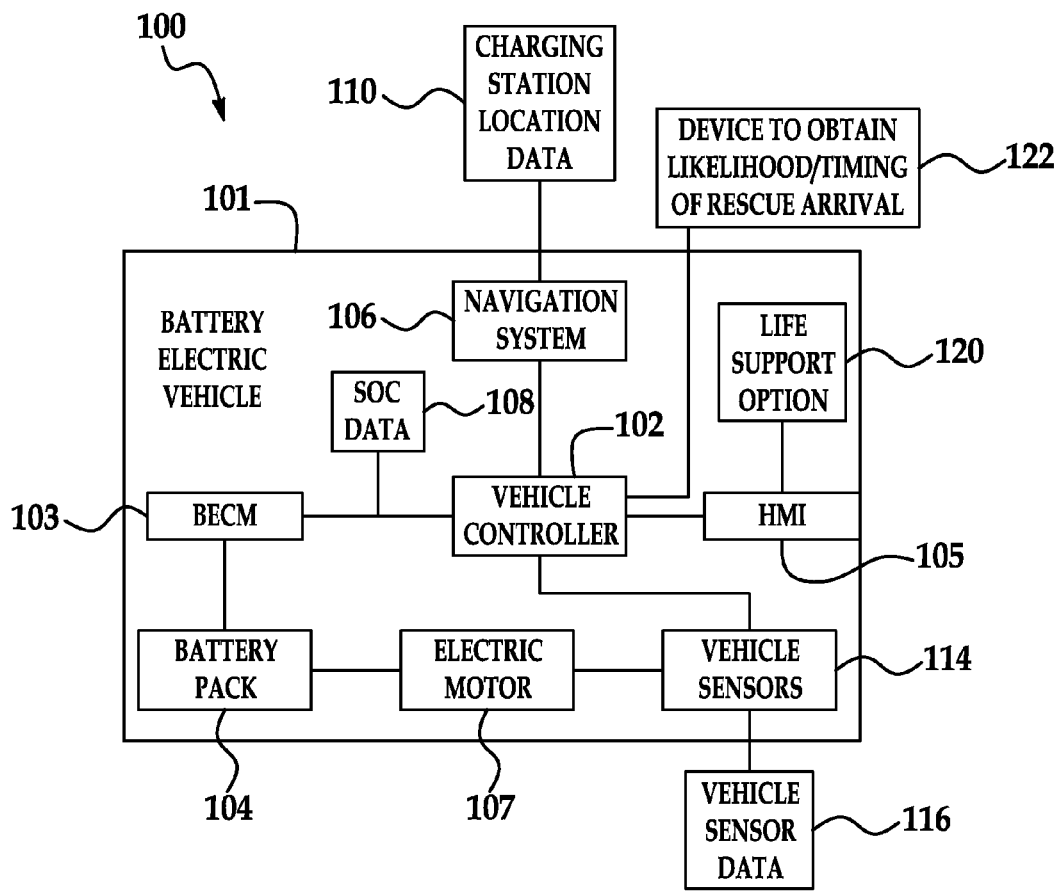
FIG. 1 is a block diagram of a battery electric vehicle (BEV) according to an illustrative embodiment of the BEV life support system.

Referring initially to FIG. 1, an exemplary battery electric vehicle (BEV) 101 which is equipped with an illustrative embodiment of the BEV life support system 100 is shown. The BEV 101 may be any type of EV (Electric Vehicle) or PHEV (Plug-In Hybrid Electric Vehicle) which utilizes at least one battery or battery pack and electric motor for vehicle conveyance. Non-limiting examples of commercially-available BEVs 101 which are suitable for implementation of the BEV life support system 100 include the FORD FOCUS (trademark) BEV, FORD TRANSIT (trademark) BEV and FORD C-MAX (trademark) PHEV (Plug In Hybrid Electric) and FORD Fusion (trademark) PHEV. The BEV life support system 100 is adapted to determine the probability that the BEV 101 will reach one or more battery charging stations within the vicinity of the BEV 101 based on the state of charge (SOC) of the vehicle battery. The determined probability enables the vehicle operator to choose whether to continue driving with little to no likelihood of reaching a charging station or to safely pull over now, request assistance and use the remaining battery charge for "life support functions" until assistance arrives.

Generally, the BEV 101 may include at least one vehicle controller 102. A human machine interface (HMI) 105 interfaces with the vehicle controller 102. The HMI 105 may be provided on the dashboard (not shown) of the BEV 101 or in some other suitable accessible location to enable an operator of the BEV 101 to interface with the vehicle controller 102 for control of the BEV 101.

A battery energy control module (BECM) 103 may interface with the vehicle controller 102. A battery pack 104 may interface with the BECM 103. The battery pack 104 may include at least one traction battery (not shown) which supplies electrical power to an electric traction motor 107 that facilitates conveyance of the BEV 101 either alone or in combination with an internal combustion engine (not shown). The BECM 103 is adapted to monitor the State of Charge (SOC) of the battery pack 104 and transmit SOC data 108 which indicates the state of charge of the battery pack 104 to the vehicle controller 102.

Vehicle sensors 114 may interface with the vehicle controller 102 and with the electric traction motor 107 and other operational components (not shown) of the BEV 101. The vehicle sensor 114 may be adapted to gather and transmit vehicle sensor data 116 such as vehicle performance data and the like to the vehicle controller 102. The vehicle performance data may include such parameters as the speed of the BEV 101 and the rate of consumption of electrical power from the battery pack 104. Weather forecast data which may be obtained from cloud sources or a content delivery network, and topography data which may be obtained from navigation system terrain databases, cloud sources or a content delivery network may relate to the weather and topography, respectively, of the route along which the BEV 101 travels.

A Navigation System 106 may interface with the vehicle controller 102. The navigation system 106 may receive charging station location data 110 which indicates the location of one or more electric battery charging stations in the vicinity of the BEV 101, and the distances between the charging stations and the BEV 101, and transmit the charging station location data 110 to the vehicle controller 102. The vehicle controller 102 may be adapted to indicate the charging station location data 110 on the HMI 105 to enable the operator of the BEV 101 to determine the locations and distances of the electric battery charging stations relative to the BEV 101. In some embodiments, the vehicle controller 102 may receive the charging station location data 110 from cloud sources via a content delivery network or an internal on-board vehicle database.

Based on the SOC data 108 from the BECM 103, the vehicle sensor data 116 from the vehicle sensors 114 and the charging station location data 110 from the Navigation System 106, the vehicle controller 102 is adapted to determine the probability that the BEV 101 will reach one or more of the electric battery charging stations which is located by the Navigation System 106 and is within a range contour for a particular likelihood or probability of arrival. The vehicle controller 102 is adapted to indicate the determined probability on the HMI 105. The HMI 105 may be adapted to indicate to the operator of the BEV 101 the distances and locations of battery charging stations (not shown) in the vicinity of the BEV 101 as well as the determined probability that the BEV 101 will reach each of the battery charging stations depending on the current state of charge (SOC) of the battery pack 104.

In some embodiments, the HMI 105 may include a life support option 120 in which the operator of the BEV 101 can elect to terminate further operation of the BEV 101 and request assistance from rescue personnel. The life support option 120 may be adapted to coach the operator in pulling the BEV 101 over to the side of the road and may assist the operator in requesting assistance.

In some embodiments, the HMI 105 may have the capability of using the GP Navigation System 106 to assist the operator of the BEV 101 in selecting a location at which to stop the BEV 101 (such as a rest area or restaurant, for example) and create a route to guide the operator to the location. The vehicle controller 102 may use the distance to each location, the SOC required to reach each location, the probability that the BEV 101 will reach each location and the remaining battery time while at each location as weighted factors to select and indicate the preferred location for the operator on the HMI 105.

In some embodiments, the vehicle controller 102 can use the HMI 105 to assist the operator of the BEV 101 in optimizing the power consumption based on the vehicle occupants' needs, climate and expected duration until help is expected. In some applications, vehicle occupants without special needs may select the life support option 120 for a more pleasurable wait for assistance with communication and infotainment services powered by the battery pack 104. A device to obtain likelihood/timing of rescue arrival 122 may interface with the vehicle controller 102. The device to obtain likelihood/timing of rescue arrival 122 may be adapted to determine the likelihood or timing of the arrival of rescue personnel to the vehicle BEV 101 in the event that the occupants of the BEV 101 elect to terminate further operation of the BEV 101 and request assistance from rescue personnel. The device to obtain likelihood/timing of rescue arrival 122 may use a probability density vs. time graph (FIG. 4) which represents the probability of the occupants receiving assistance over a period of time.

Figure 2:
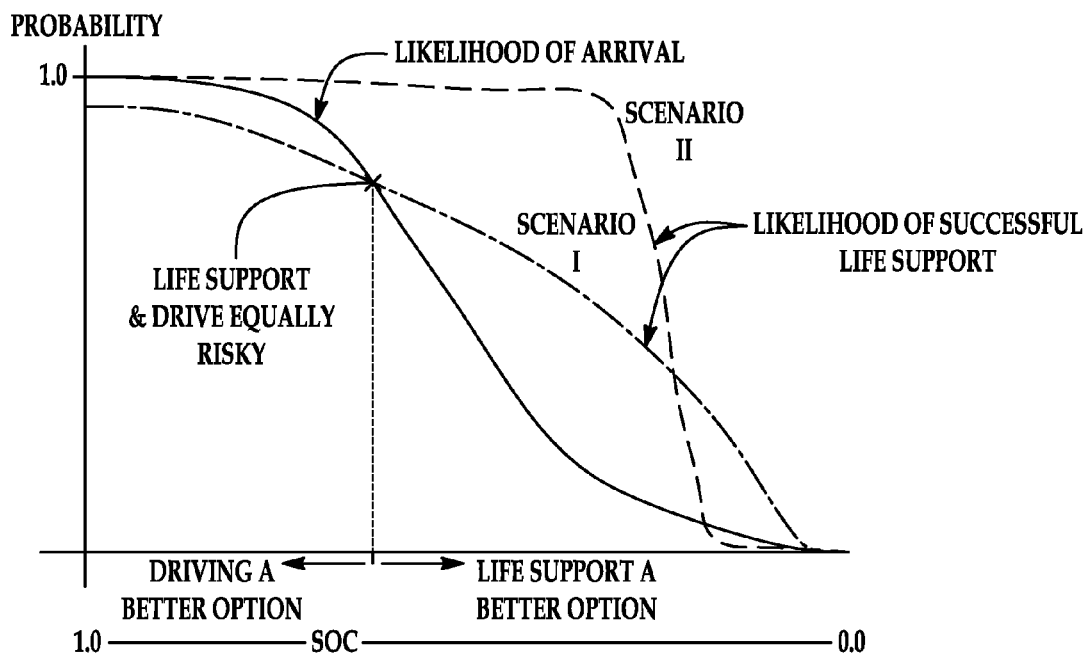
FIG. 2 is a line graph which illustrates the probability of a BEV reaching a charging station as a function of the state of charge of the vehicle traction battery and the distance to charging stations in the vicinity of the BEV.

Referring next to FIG. 2, a line graph 200 which illustrates the probability of a BEV reaching a charging station as a function of the state of charge of the vehicle traction battery and the distance to charging stations in the vicinity of the BEV is shown. The solid line in the graph represents the estimated probability of arriving at a charging station given the current SOC of the vehicle battery at any time in the trip based on estimated stochastic noise in the energy calculation. The dashed lines in the graph represent the estimated probability of maintaining life support until help arrives under two different scenarios given stochastic variability of energy consumption. When the dashed line is below the solid line, continuing to drive is the safest choice. When the dashed line is above the solid line, the life support option 120 is the safest choice. When the two lines intersect, the vehicle operator may be notified via the HMI. The calculations may be updated on continuous intervals to adapt the method to changing conditions as the vehicle progresses through the route.

Figure 3:
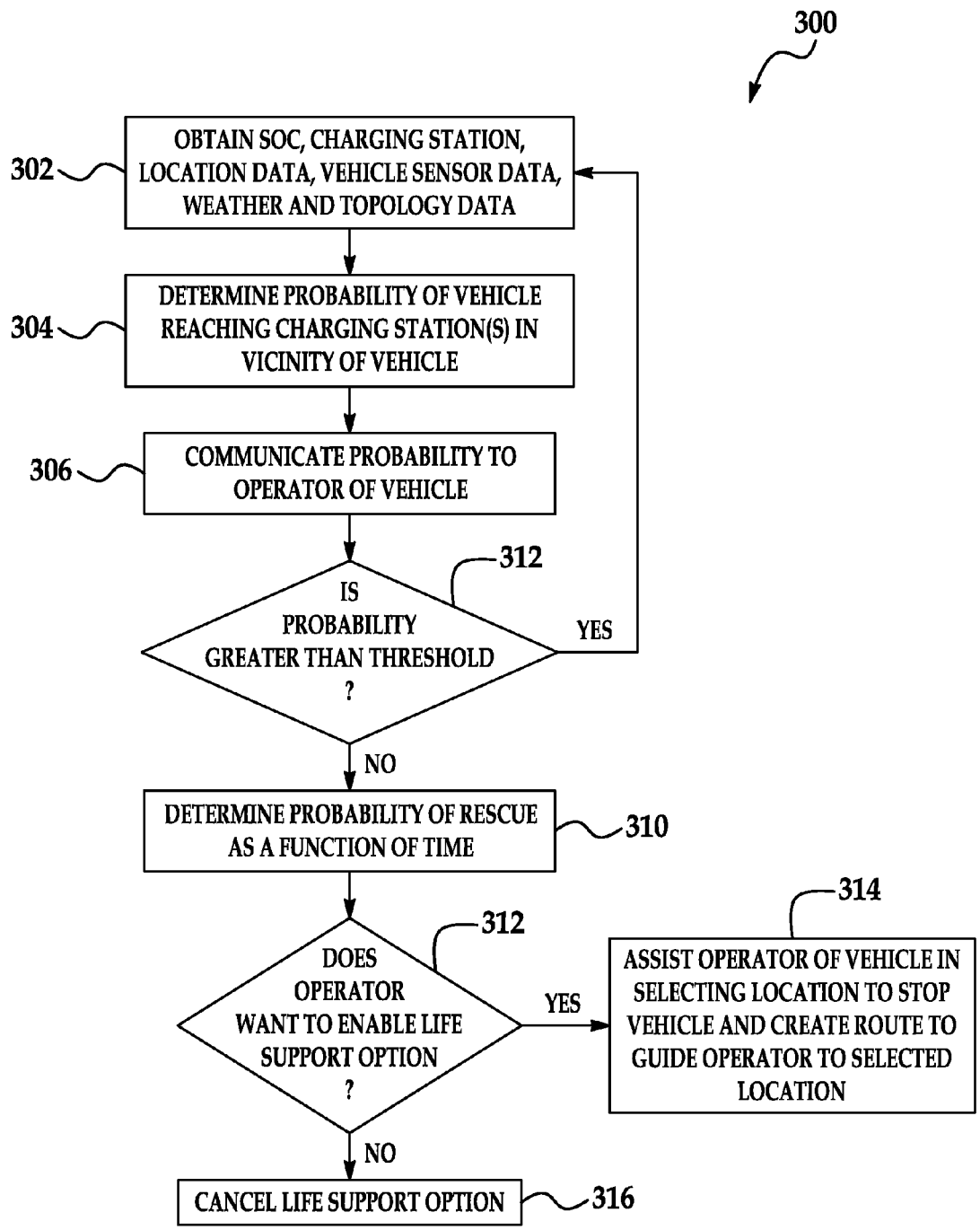
FIG. 3 is a flow diagram of an illustrative embodiment of the BEV life support method.
Figure 4:
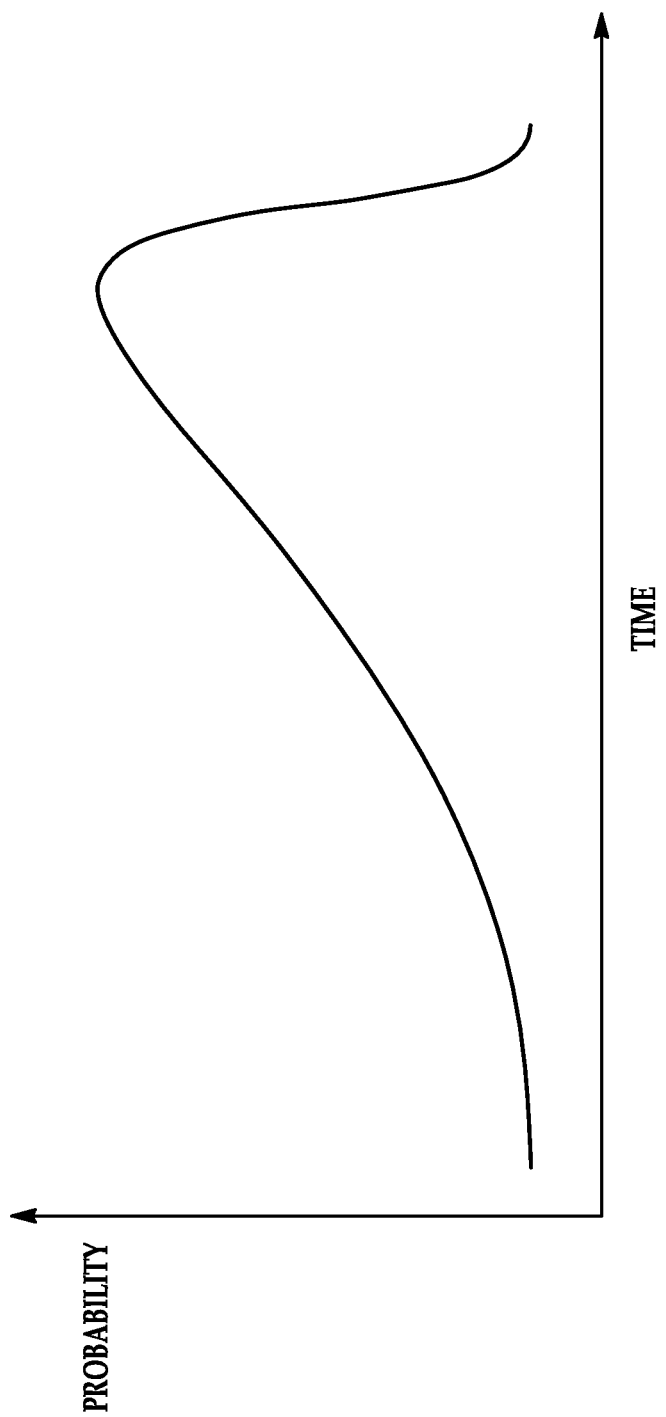
FIG. 4 is a probability density vs. time curve which represents the probability of a user receiving assistance over a period of time.

Referring next to FIG. 3, a flow diagram 300 of an illustrative embodiment of the BEV life support method is shown. In block 302, SOC data, charging station location data, vehicle sensor data and weather and topology data may be obtained. In block 304, the probability that the BEV will reach a charging station or stations within the vicinity of the BEV may be determined. In block 306, the determined probability is communicated to an operator of the vehicle. In block 308, a determination may be made as to whether the probability determined in block 304 is greater than a predetermined threshold probability. If the probability determined in block 304 is greater than the threshold probability, then the method may return to block 302. If the probability determined in block 304 is equal to or less than the threshold probability, then the method may continue to block 310. In block 310, the probability of rescue as a function of time may be determined. In some embodiments, the probability may be determined using a probability density vs. time curve (FIG. 4).

In block 312, a determination may be made as to whether the operator of the vehicle wants to enable a life support option. If yes, then in block 314, the operator of the BEV may be assisted in selecting a location to stop the BEV and a route to guide the operator to the selected location may be created. If no, then the life support option may be canceled in block 316.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A battery electric vehicle life support system for a battery electric vehicle, comprising:
at least one controller adapted to receive charging station location data;
a vehicle battery interfacing with the at least one controller, the at least one controller adapted to receive state of charge data from the vehicle battery;
the at least one controller configured to determine a probability that the vehicle will reach at least one battery charging station based on the state of charge data and the charging station location data;
the at least one controller further configured to determine a period of time, based upon the state of charge data if the vehicle is stopped, in which the battery could provide occupant life support, including by maintaining an internal temperature to sustain an occupant; and
the at least one controller further configured to communicate the determined probabilities to an occupant of the vehicle.

2. The system of claim 1 further comprising at least one vehicle sensor interfacing with the at least one controller, the at least one controller adapted to receive vehicle sensor data from the at least one vehicle sensor.

3. The system of claim 2 wherein the vehicle sensor data comprises vehicle performance data.

4. The system of claim 1 wherein the at least one controller further receiving weather forecast data obtained from cloud sources or a content delivery network.

5. The system of claim 1 wherein the at least one controller further receiving topography data obtained from navigation system terrain databases, cloud sources or a content delivery network.

6. The system of claim 1 wherein the at least one controller is adapted to enable an operator of the vehicle to terminate further operation of the vehicle and request assistance from rescue personnel.

7. The system of claim 1 wherein the at least one controller is adapted to assist an operator of the vehicle in selecting a location at which to stop the vehicle and create a route to guide the operator to the location.

8. The system of claim 1 further comprising a global positioning system interfacing with the at least one controller, the at least one controller adapted to receive the charging station location data from the global positioning system.

9. A battery electric vehicle life support system for a battery electric vehicle, comprising:
at least one controller adapted to receive charging station location data;
a vehicle battery interfacing with the at least one controller, the at least one controller adapted to receive state of charge data from the vehicle battery;
the at least one controller configured to determine a probability that the vehicle will reach at least one battery charging station based on the state of charge data and the charging station location data;
the at least one controller further configured to determine a period of time, based upon the state of charge data if the vehicle is stopped, in which the battery could provide occupant life support, including by maintaining an internal temperature to sustain an occupant; and
a human machine interface interfacing with the at least one controller, the human machine interface adapted to communicate the determined probabilities.

10. The system of claim 9 further comprising at least one vehicle sensor interfacing with the at least one controller, the at least one controller adapted to receive vehicle sensor data from the at least one vehicle sensor.

11. The system of claim 10 wherein the vehicle sensor data comprises vehicle performance data.

12. The system of claim 9 wherein the at least one controller further receiving weather forecast data obtained from cloud sources or a content delivery network.

13. The system of claim 9 wherein the at least one controller further receiving topography data obtained from navigation system terrain databases, cloud sources or a content delivery network.

14. The system of claim 9 wherein the at least one controller is adapted to enable an operator of the vehicle to terminate further operation of the vehicle and request assistance from rescue personnel via the human machine interface.

15. The system of claim 9 wherein the at least one controller is adapted to assist an operator of the vehicle in selecting a location at which to stop the vehicle and create a route to guide the operator to the location via the human machine interface.

16. The system of claim 9 further comprising a navigations system interfacing with the at least one controller, the at least one controller adapted to receive the charging station location data from the navigation system.

17. A battery electric vehicle life support method, comprising:
obtaining state of charge data and charging station location data;
determining a probability of a battery electric vehicle reaching at least one charging station based on the state of charge data and the charging station location data;
the at least one controller further configured to determine a period of time, based upon the state of charge data if the vehicle is stopped, in which the battery could provide occupant life support, including by maintaining an internal temperature to sustain an occupant; and
communicating the determined probabilities to an occupant of the vehicle.

18. The method of claim 17 further comprising an operator of the battery electric vehicle engaging a life support option for request of assistance.

19. The method of claim 17 further comprising assisting an operator of the battery electric vehicle in selecting a location to stop the battery electric vehicle and creating a route to guide the operator to the location.

20. The method of claim 17 further comprising obtaining vehicle sensor data and wherein determining at least one of the probabilities is further based on the vehicle sensor data.

* * * * *